United States Patent

Onuki

[11] Patent Number: 5,115,308
[45] Date of Patent: May 19, 1992

[54] IMAGE PROCESSING APPARATUS
[75] Inventor: Kazuhiko Onuki, Tokyo, Japan
[73] Assignee: Canon Kabushiki Kaisha, Tokyo, Japan
[21] Appl. No.: 535,594
[22] Filed: Jun. 11, 1990
[30] Foreign Application Priority Data
   Jun. 30, 1989 [JP] Japan .................. 1-169417
[51] Int. Cl.⁵ .................. G06K 9/20; H04N 1/387
[52] U.S. Cl. .................. 358/102; 358/401; 355/45
[58] Field of Search .......... 355/45, 43, 68, 271; 358/97, 102, 250, 400, 401

[56] References Cited

U.S. PATENT DOCUMENTS

| 4,367,033 | 1/1983 | Watanabe | 355/45 |
| 4,650,316 | 3/1987 | Matsumoto | 355/68 |
| 4,682,242 | 7/1987 | Sugita | 358/401 |
| 4,700,237 | 10/1987 | Yoshioka et al. | 358/102 |
| 4,751,553 | 6/1988 | Fukasawa | 355/45 |
| 4,800,413 | 1/1989 | Ito et al. | 355/45 |
| 4,873,552 | 10/1989 | Otsuki | 355/271 |
| 4,879,572 | 11/1989 | Onuki et al. | 355/45 |
| 4,881,099 | 11/1989 | Onuki et al. | 355/45 |
| 4,894,681 | 1/1990 | Watanabe et al. | 355/45 |
| 4,947,213 | 8/1990 | Murata et al. | 355/45 |

Primary Examiner—Leo H. Boudreau
Assistant Examiner—David Fox
Attorney, Agent, or Firm—Fitzpatrick, Cella, Harper & Scinto

[57] ABSTRACT

An image processing apparatus switchable between an observation mode for projecting an image onto an observation position and a read mode for projecting the image onto a read position includes an optical system for forming an optical path for projecting the image onto the observation position. The optical system includes at least one movable mirror for receiving a light beam from the image. The mirror is movable to a first position for reflecting the light beam from the image toward the observation position and to a second position for reflecting the light beam toward the read position.

The apparatus also includes a first moving mechanism for moving the mirror to the first position and to the second position, an image sensor disposed at the read position and movable so as to enter into the optical path or to retreat from the optical path, and a second moving mechanism for moving the image sensor along a straight line crossing the optical path.

13 Claims, 5 Drawing Sheets

IMAGE PROCESSING APPARATUS

BACKGROUND OF THE INVENTION

1. Field of the Invention

This invention relates to an image processing apparatus switchable between an observation mode in which an image of an original, such as a microfilm or the like, is projected onto a screen to observe the image, and a read mode in which the image is projected onto an image sensor to convert it into an electrical image signal.

2. Description of the Prior Art

A conventional image reading apparatus is shown in FIG. 6. An image of a microfilm F is magnified, reflected by mirrors 106 and 107, and projected onto a screen 108. On the other hand, when the image is read by an image sensor S, a moving mirror 120 first enters into an image projection optical path, and stops at position 120' (shown by broken lines). The light beam of the image is then reflected by the moving mirror 120' and a mirror 121, and is projected onto line "a". The image sensor S then moves along line "a" in the direction of the arrow up to point S' to read the image of the microfilm F.

In such a conventional apparatus, the image sensor S moves outside the image projection optical path for the screen, and is placed in the reflection optical path of the mirror 121 dedicated for reading, which is placed outside the image projection optical path. Hence, there are problems in that a large space dedicated for reading is needed, the entire apparatus thereby becomes large, the structure of the apparatus becomes complicated, and the apparatus therefore becomes expensive.

There has also been known a method in which an image sensor is movably provided behind the screen, and the image of the film is read by moving the image sensor along the screen. In this method, however, there is the problem in that, since the image sensor is placed at a position off the imaging position of the image on the screen, focus adjustment must be performed every time the image is read by the image sensor, and hence it is necessary to separately perform focus adjustment for the screen and the image sensor.

There is also a problem in that the image sensor is influenced by external light.

SUMMARY OF THE INVENTION

It is an object of the present invention to provide an image processing apparatus which solves the above-described problems.

It is another object of the present invention to provide an image processing apparatus in which an image can be observed on a screen, and the image can also be read and converted into an electrical signal.

It is still another object of the present invention to provide an image processing apparatus the size of which can be made small, and the structure of which can be simplified by effectively utilizing the space in the apparatus.

According to the present invention, an apparatus for projecting an image of an original onto a screen and for reading the image by an image sensor has a configuration in which at least one movable reflecting member for reflecting an effective light beam of the image of the original onto the screen is provided, and the image sensor is also movably provided so as to enter into the optical path between the image of the original and the reflecting member or to retreat from the optical path.

According to the above-described configuration, the image can be read by effectively utilizing the image projection optical path for the screen, the apparatus can be made small, and focus adjustment for the screen and the image sensor can be performed in common.

DETAILED DESCRIPTION OF THE PREFERRED EMBODIMENTS

The present invention will now be explained according to the preferred embodiments.

Figure 1:
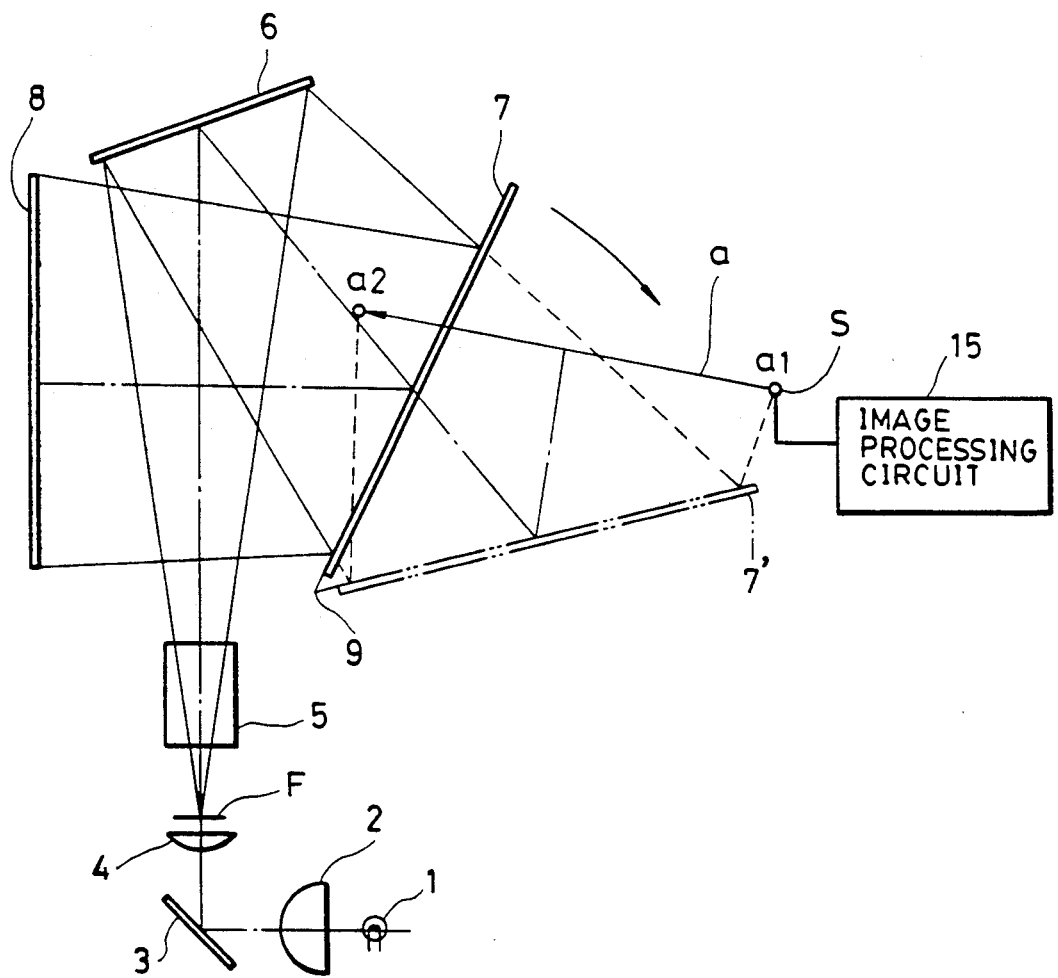
FIG. 1 is the schematic configuration of an image processing apparatus according to the present invention.

FIG. 1 shows a first embodiment of the image processing apparatus of the present invention. In FIG. 1, there are shown a lamp 1, serving as a light source, for illuminating a microfilm, condenser lenses 2 and 4, a reflecting mirror 3 for upwardly guiding a light beam from the lamp 1, and a microfilm F. A projection lens 5 magnifies and projects an image of the microfilm F. A fixed mirror 6 is disposed above the lens 5. A movable mirror 7 rotates in the direction of the arrow around a fulcrum 9.

The movable mirror 7 is placed at a first position shown by solid lines in an observation mode, in which the light beam of the image from the film F reflected by the fixed mirror 6 is reflected toward a screen 8 to form an observation optical path, which allows a user to observe the image of the film F on the screen 8.

The movable mirror 7 moves to a second position shown by two-dot chain lines in a read mode, in which the light beam of the image from the film F reflected by the fixed mirror 6 is not directed toward the screen 8, but is upwardly reflected to form a read path.

The screen 8 is disposed at an observation position, and comprises a known transparent light-diffusing plate.

A one-dimensional image sensor S for reading the image of the film F and for converting the image into an electrical signal is disposed at a read position, and comprises a CCD (charge-coupled device), a photodiode, or the like. The image sensor S is placed at position a1 behind the movable mirror 7 when the movable mirror 7 is placed at the first position, and moves up to position a2 along a straight line "a" in a direction crossing the reflection optical path of the movable mirror 7 placed at the first position, when the movable mirror 7 is placed at the second position 7'. The track "a" of the movement of the image sensor S extends over both the outside and inside of the observation optical path. By making the range of the movement of image sensor S within the observation optical path large, and making the range outside the observation optical path small, the entire apparatus can be made small.

While the image sensor S moves along the track "a" from position a1 to position a2, at least one frame of the image of the film is read. An image signal output from the image sensor S is binary-coded by an image processing circuit 15. According to the resultant image signal, the image is printed on print paper by a laser-beam printer or an ink-jet printer, or sent to a memory, such as an optical disk or the like, to perform storage of the image.

The system is set so that the optical path length from the film F to the screen 8 is equal to the optical path length from the film F to the track "a" of the movement of the image sensor S. Hence, if the image on the screen 8 is adjusted to be correctly focused, the image on the image sensor S is also in a correctly focused state.

Figure 2:
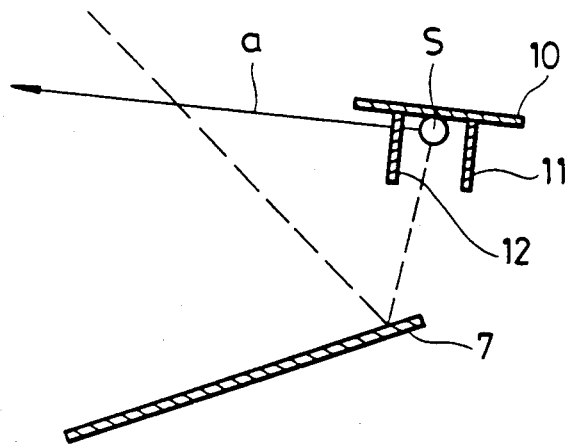
FIG. 2 is a cross-sectional view showing a mounting portion of an image sensor.

FIG. 2 shows a mounting portion of the image sensor S. The sensor S is mounted on a printed circuit board 10. At both sides of the sensor S are provided obturating walls 11 and 12, which are at least longer than the width of the effective light beam of the image in the longitudinal direction of the sensor S. The obturating walls 11 and 12 prevent external light incident into the main body box of the apparatus through the screen 8 from entering into the sensor S.

The operation of the above-described apparatus will now be explained. The image on the microfilm F is irradiated by light from the lamp 1, which is condensed by the condenser lenses 2 and 4, and the reflecting mirror 3, and is upwardly guided. The irradiated image frame is magnified by the projection lens 5, reflected by the fixed mirror 6 and the movable mirror 7 placed at the first position, and projected onto the screen 8. In this state, the operator moves the microfilm F while watching the screen 8 in order to retrieve a desired frame in the microfilm F. After the desired frame has been projected onto the screen 8, the operator depresses a read command switch (not shown). The movable mirror 7 then rotates in the direction of the arrow around the fulcrum 9, and stops at the second position 7'. At this time, the image of the film F is projected toward the straight line "a" by the movable mirror 7. In this state, the sensor S moves along the line "a" in the direction of the arrow from position a1 (the right end) up to position a2 shown in FIG. 1, and reads the image during this movement.

Figure 4:
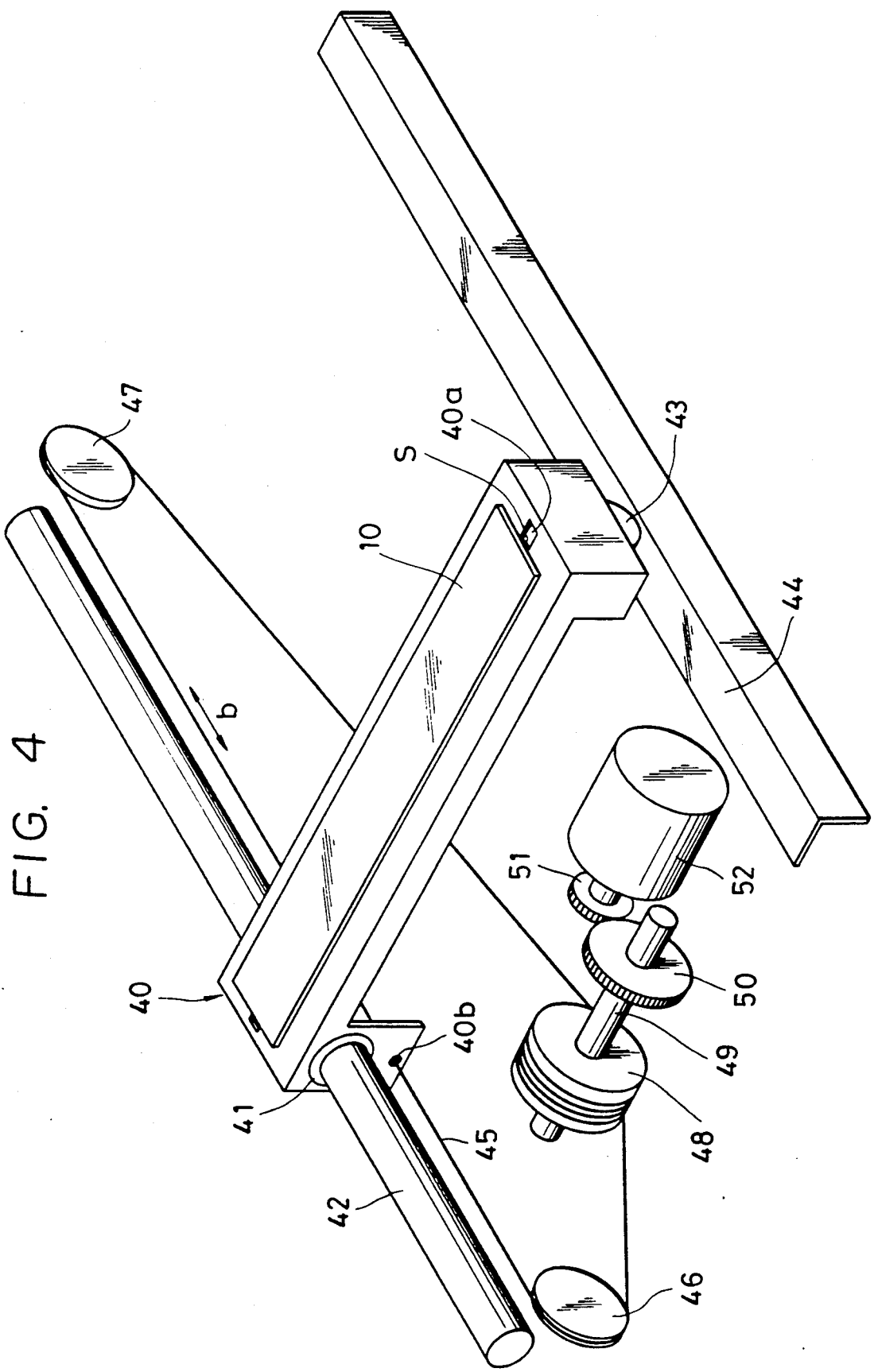
FIG. 4 is a perspective view of a mechanism for moving an image sensor.
Figure 5:
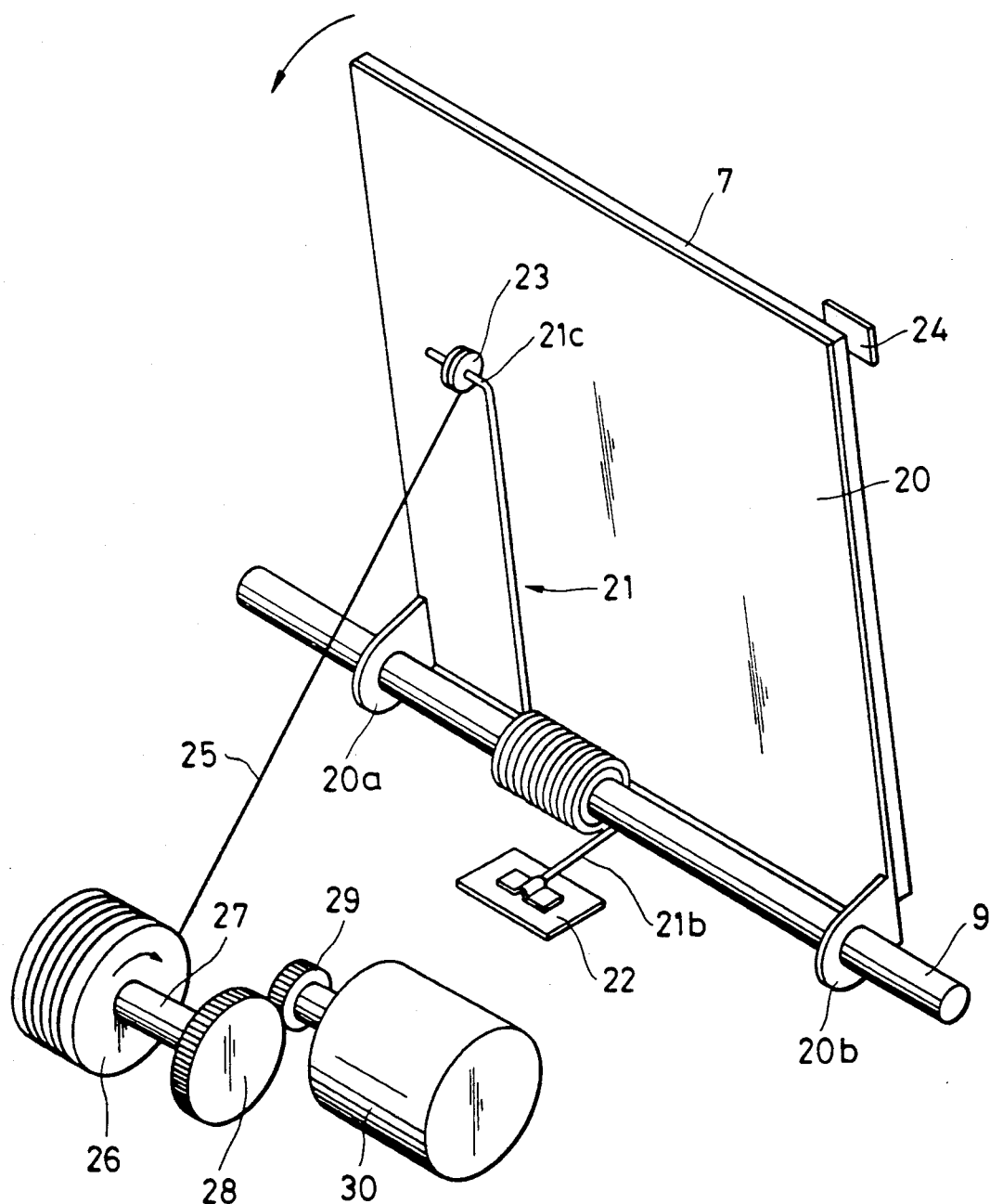
FIG. 5 is a perspective view of a mechanism for moving a mirror.
Figure 6:
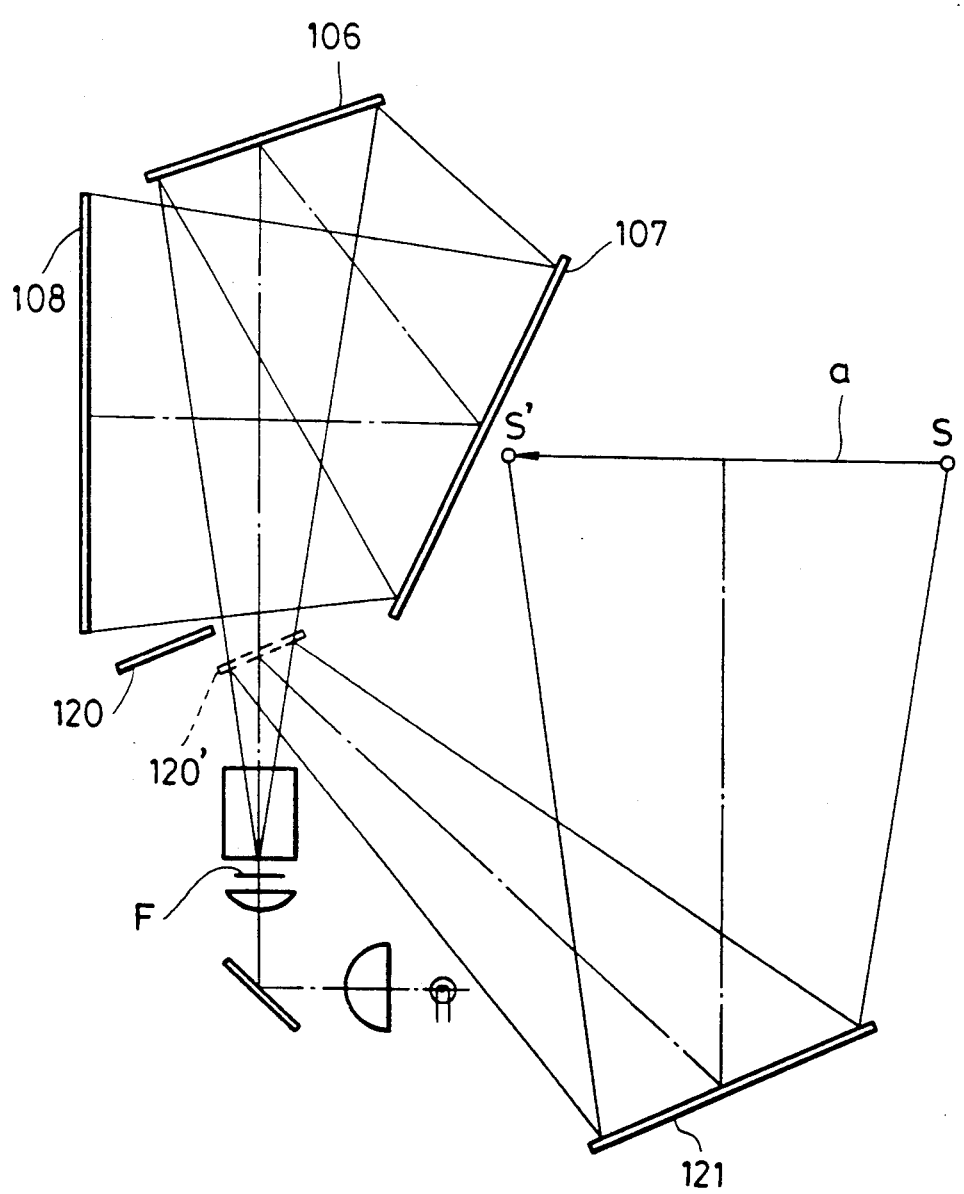
FIG. 6 shows the configuration of a conventional image processing apparatus.

FIG. 4 shows a mechanism for moving the image sensor S, and FIG. 5 shows a mechanism for rotating the movable mirror 7.

In FIG. 4, the printed circuit board 10, to which the sensor S is fixed, is fixed to an upper portion of a moving platform 40. A slit-like opening 40a provided at a position facing the image sensor S on the upper portion of the moving platform extends in the longitudinal direction of the sensor S. The light beam of the image from the film F is guided from below the moving platform 40 to the opening 40a, and is projected onto the image sensor S after passing the opening 40a.

One end of the moving platform 40 is supported on a guide shaft 42 via a bearing 41 having small sliding resistance, and another end is supported on a guide rail 44 by a roller 43 rotatably pivoted at a lower end of the moving platform 40.

Wire 45 is threaded through a hole 40b formed in a lower end portion of the moving platform 40, and is fixed to the hole 40b.

The wire 45 is wound around a rotatable drum 48 via pulleys 46 and 47. A gear 50 is fixed to one end of a shaft 49 fixed to the drum 48, and meshes with a gear 51 connected to a motor 52 for moving the sensor.

When the motor 52 is driven, the drum 48 rotates via the gears 51 and 50. The wire 45 thereby moves in the forward or reverse direction as shown by arrow "b", and the moving platform 40 moves along the guide shaft 42 and the rail 44.

The image of the film F is read by the image sensor S during the movement of the wire 45 in the forward or reverse direction.

In the mirror rotating mechanism shown in FIG. 5, a support plate 20 supports the movable mirror 7. A rod-like fulcrum 9 is fitted in circular holes in bent portions 20a and 20b provided at lower end portions of the support plate 20. The support plate 20 is configured so as to rotate in the counterclockwise direction around the fulcrum 9. One end 21b of a coil spring 21 wound around the fulcrum 9 is fixed to a fixing unit 22 of the main body of the apparatus. A roller 23 provided at another end 21c of the coil spring 21 is energized so as to press the support plate 20 by the coil spring 21. Accordingly, the support plate 20 is energized so as to rotate in the clockwise direction by the coil spring 21, and rotates in the counterclockwise direction if the energization by the coil spring 21 is removed.

A stopper 24 is fixed to the main body of the apparatus. The movable mirror 7 is energized to a position contacting the stopper 24 by the function of the coil spring 21.

In a state in which the mirror 7 contacts the stopper 24, the mirror 7 is positioned at the above-described first position, that is, the position to form the reader optical path.

The roller 23 is connected to the drum 26 by the wire 25, and moves in the direction of the drum 26 by being pulled by the wire 25 when the drum 26 rotates in a direction to wind the wire 25. That is, when the drum 26 rotates in the direction of the arrow, the roller 23 rotates in the counterclockwise direction around the fulcrum 9 against the force of the coil spring 21. The support plate 20 thereby rotates in the counterclockwise direction, and the movable mirror 7 moves toward the above-described second position.

A gear 28 is fixed to one end of a shaft 27 fixed to the drum 26, and meshes with a gear 29 connected to a motor 30 for moving the mirror.

In the above-described mechanism, when the start of reading operation is commanded by operating a read command switch, the motor 30 is driven to rotate the drum 26 in the clockwise direction via the gears 28 and 29 and to wind the wire 26 around the drum 26. The drum 23 is thereby pulled toward the drum 26 against the force of the coil spring 21, and the support plate 20 and the movable mirror 7 rotate in the counterclockwise direction around the fulcrum 9.

When the movable mirror 7 reaches the above-described second position (the position depicted by the two-dot chain lines in FIG. 1), the support plate 20 is locked at the second position by a lock means comprising a hook (not shown). The rotating movement of the support plate 20 is thus regulated, and the motor 30 stops. Even when the motor 30 has stopped, the mirror 7 is not returned to the first position by the coil spring 21, since the support plate 20 is locked.

Subsequently, the motor 52 shown in FIG. 4 is driven to move the moving platform 40 at a constant speed via the gears 50 and 51, the drum 48 and the wire 45. While the image sensor S moves along the track "a" in the forward or reverse direction by the forward or reverse rotation of the motor 52, the image of the film F is read by the image sensor S. For example, while the image sensor S moves in the forward direction from home position a1 to position a2 within the reader optical path, the density of the image is measured, or it is determined whether the film is positive or negative by the image sensor S. While the image sensor S moves in the reverse direction from position a2 to home position a1, the image is read by the image sensor S. Switching between the forward and reverse directions of the motor 52 is performed by detecting the position of the moving platform 40 by a sensor, such as a switch or the like.

Figure 3:
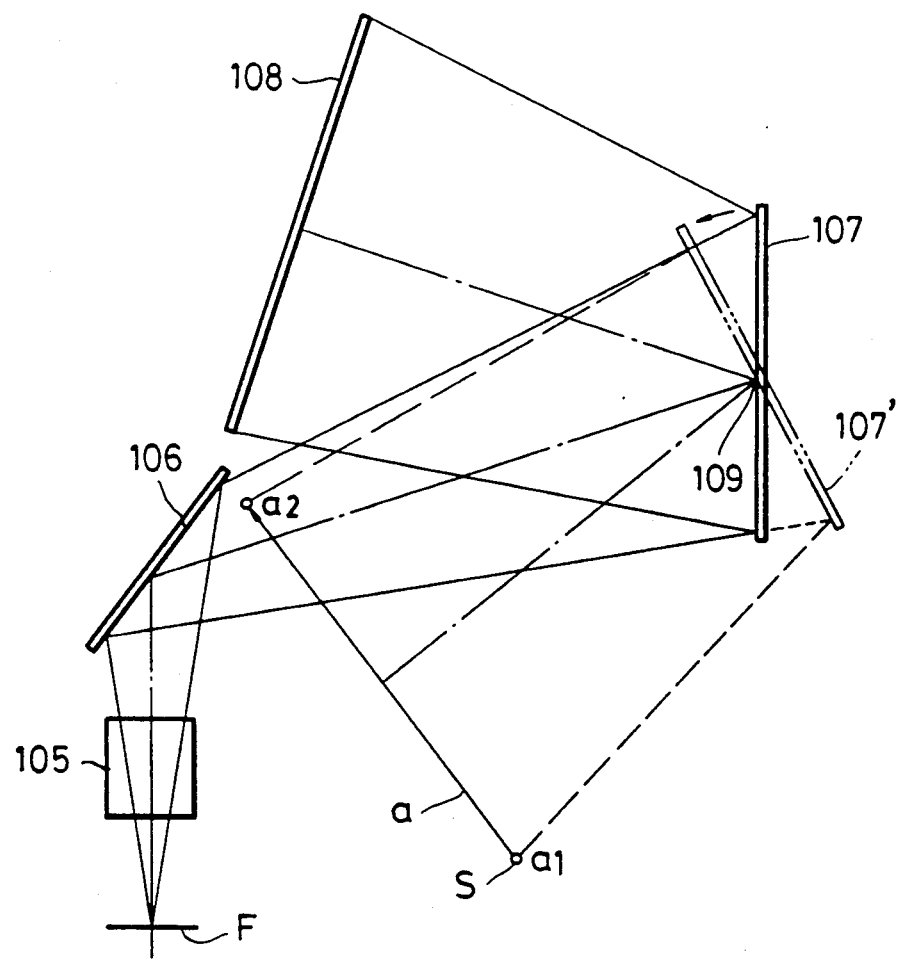
FIG. 3 is a diagram showing the schematic configuration of another embodiment.

FIG. 3 shows another embodiment of the present invention. In FIG. 3, there are shown a microfilm F, a projection lens 105 for magnifying and projecting an image of the microfilm F, a fixed mirror 106, and a movable mirror 107 rotating in the direction of the arrow around a fulcrum 109.

The movable mirror 107 rotates between a first position shown by solid lines and a second position shown by two-dot chain lines.

When the movable mirror 107 is placed at the first position, the light beam of the image of the film F is projected onto a screen 108 via the lens 105, and the mirrors 106 and 107.

A line image sensor S moves along a linear track "a" from position a1 to position a2. The track "a" extends in a direction of crossing the optical path between the fixed mirror 106 and the movable mirror 107. A part of the track "a" penetrates within the image projection optical path formed between the mirrors 106 and 107.

The system is set so that the optical path length from the film F to the screen 8 is equal to the optical path length from the film F to the image sensor S.

In a reader mode, the movable mirror 107 is placed at the first position, and the image of the film F is projected onto the screen 108. On the other hand, the image sensor S is placed at position a1 to retreat from the optical path of the image.

In a read mode, the movable mirror 107 is placed at the second position, and the image of the film F is projected onto the image sensor S by the movable mirror 107. In this state, the image sensor S moves along the track "a" at a constant speed, reads the image of one frame of the film F while moving from position a1 to position a2, and converts the image into an electrical signal.

As described above, in the present invention, the image sensor enters into or retreats from the optical path for the reader formed between the image of the original and the movable mirror, and the image is thereby projected onto the screen or the image sensor. Hence, it is possible to effectively utilize the optical path in the optical system, and to make the size of the apparatus small.

Furthermore, it is possible to place the image sensor and the screen at optically equivalent positions, and hence to perform focus adjustment for the two units in a simple manner.

What is claimed is:

1. An image processing apparatus switchable between an observation mode for projecting an optical image onto an observation position and a read mode for projecting the optical image onto a read position, said apparatus comprising:
    optical means for forming an optical path for projecting the optical image onto said observation position and said read position, said optical means including a mirror being movable between a first position and a second position, said mirror projecting said optical image reflected by said mirror onto said observation position in said first position and projecting said optical image reflected by said mirror onto said read position in said second position, said mirror being set in said first position when the apparatus is switched in said observation mode and being set in said second position when the apparatus is switched in said read mode;
    first moving means for moving said mirror to said first position and to said second position;
    an image sensor disposed at said read position and being movable in a direction crossing the reflection optical path of said mirror when said mirror is set in said second position; and
    second moving means for moving said image sensor in the direction crossing said reflection optical path.

2. An image processing apparatus according to claim 1, wherein, after said mirror has been moved to said second position by said first moving means, said image sensor is moved by said second moving means.

3. An image processing apparatus according to claim 1, wherein said mirror is rotatable around a rotation shaft.

4. An image processing apparatus according to claim 1, wherein said mirror moves so that, in said observation mode, a reflecting surface of said mirror faces said observation position and a face opposite to the reflecting surface of said mirror faces said image sensor, and, in said read mode, the reflecting surface of said mirror faces said image sensor.

5. An image processing apparatus according to claim 1, wherein said optical means includes a lens and a fixed mirror disposed facing said lens, and wherein said movable mirror is disposed at a position receiving a light beam from said fixed mirror.

6. An image processing apparatus according to claim 5, wherein said image sensor moves so as to enter into or retreat from an optical path formed between said fixed and movable mirrors.

7. An image processing apparatus according to claim 1, wherein said image sensor comprises a photoelectric conversion device array.

8. An image processing apparatus according to claim 1, further comprising means for obturating external light directly projected toward said image sensor through said observation position, said obturating means moving together with said image sensor as one body.

9. A film reading apparatus comprising:
    optical means for projecting an optical image of a film onto a screen, said optical means including at least one movable reflecting member for reflecting the optical image of the film, and said reflecting member being movable to a first position for observing the optical image and to a second position for reading the optical image, said reflecting member projecting said reflected optical image onto said screen in said first position and projecting said reflected optical image onto said read position in said second position;
    photoelectric conversion means for reading the optical image of the film and for converting the optical image into an electrical signal, said photoelectric conversion means disposed at said read position and moving along said read position when said reflecting member is placed at said second position and reading the optical image reflected by said reflecting member; and means for moving said reflecting member to said first position and to said second position.

10. A film reading apparatus according to claim 9, further comprising second moving means for moving said photoelectric conversion means in a direction crossing a reflection optical path of said reflecting member when placed at said second position.

11. A film reading apparatus according to claim 10, wherein said second moving means reciprocates said photoelectric conversion means along a predetermined track passing within and outside of said optical path of said optical means.

12. A film reading apparatus according to claim 11, wherein said second moving means moves said photoelectric conversion means when said reflecting member is placed at said second position.

13. A film reading apparatus according to claim 11, wherein said photoelectric conversion means comprises a linear image sensor.

* * * * *

UNITED STATES PATENT AND TRADEMARK OFFICE
CERTIFICATE OF CORRECTION

PATENT NO. : 5,115,308
DATED : May 19, 1992
INVENTOR(S) : KAZUHIKO ONUKI

It is certified that error appears in the above-identified patent and that said Letters Patent is hereby corrected as shown below:

COLUMN 4

Line 51, "wire 26" should read --wire 25--.
    Line 52, "drum 23" should read --roller 23--.

COLUMN 5

Line 34, "screen 8" should read --screen 108--.

Signed and Sealed this

Twenty-eighth Day of September, 1993

Attest:

BRUCE LEHMAN

*Attesting Officer*      *Commissioner of Patents and Trademarks*